(12) United States Patent
Nakaishi

(10) Patent No.: US 11,601,422 B2
(45) Date of Patent: Mar. 7, 2023

(54) COMMUNICATION NODE, MULTI-HOP NETWORK, EQUIPMENT VALIDITY CHECK METHOD, AND PROGRAM

(71) Applicant: NEC CORPORATION, Tokyo (JP)

(72) Inventor: Hiroshi Nakaishi, Tokyo (JP)

(73) Assignee: NEC CORPORATION, Tokyo (JP)

(*) Notice: Subject to any disclaimer, the term of this patent is extended or adjusted under 35 U.S.C. 154(b) by 232 days.

(21) Appl. No.: 17/000,901

(22) Filed: Aug. 24, 2020

(65) Prior Publication Data
US 2021/0067510 A1    Mar. 4, 2021

(30) Foreign Application Priority Data

Aug. 30, 2019 (JP) .............................. JP2019-158004

(51) Int. Cl.
| | |
|---|---|
| *G06F 21/00* | (2013.01) |
| *H04L 9/40* | (2022.01) |
| *H04W 88/04* | (2009.01) |
| *G06F 21/32* | (2013.01) |
| *H04W 12/69* | (2021.01) |
| *G06V 40/20* | (2022.01) |

(52) U.S. Cl.
CPC .......... *H04L 63/0861* (2013.01); *G06F 21/32* (2013.01); *G06V 40/20* (2022.01); *H04W 12/69* (2021.01); *H04W 88/04* (2013.01)

(58) Field of Classification Search
CPC ....... H04W 88/04; H04W 12/69; G06F 21/32; G06V 40/20; H04L 63/0861
USPC .............................................. 726/7
See application file for complete search history.

(56) References Cited

U.S. PATENT DOCUMENTS

| | | | |
|---|---|---|---|
| 2006/0088042 A1* | 4/2006 | Shoham ................. | H04L 67/06 370/465 |
| 2008/0126561 A1* | 5/2008 | Ryu ....................... | H04L 63/10 709/234 |
| 2021/0195268 A1* | 6/2021 | Jiang ................ | H04N 21/25875 |

FOREIGN PATENT DOCUMENTS

| | | |
|---|---|---|
| JP | 2006-157856 A | 6/2006 |
| JP | 2013-201481 A | 10/2013 |
| JP | 2017-151759 A | 8/2017 |

* cited by examiner

*Primary Examiner* — Josnel Jeudy
(74) *Attorney, Agent, or Firm* — Sughrue Mion, PLLC

(57) ABSTRACT

A communication node relays data between equipment communicating with each other via a multi-hop network based on a multi-hop manner, records a predetermined kind(s) of data among the relayed data, checks validity of the equipment by matching the predetermined kind(s) of data against past data recorded by the recording part, and outputs a check result of the validity of the equipment to a predetermined output destination(s).

20 Claims, 12 Drawing Sheets

FIG.6

| USER ID | SYSTEM ID | USE DATE AND TIME | LOGGING DATA |
|---|---|---|---|
| T001 | S001 | 2019/8/1 12:00:00 | OPERATION GESTURE |
| .. | .. | .. | .. |
| .. | .. | .. | .. |
| .. | .. | .. | .. |

| SYSTEM ID | USER ID | USE DATE AND TIME | LOGGING DATA | | |
|---|---|---|---|---|---|
| .. | .. | .. | .. | | |
| S001 | T001 | 2019/8/1 12:01:00 | | WORK UTILIZATION DATA 1 | |
| S001 | T001 | 2019/8/1 12:02:00 | | | WORK UTILIZATION DATA 2 |
| .. | .. | .. | .. | | |

# COMMUNICATION NODE, MULTI-HOP NETWORK, EQUIPMENT VALIDITY CHECK METHOD, AND PROGRAM

FIELD

Cross Reference to Related Applications

This application is based upon and claims the benefit of the priority of Japanese patent application No. 2019-158004, filed on Aug. 30, 2019, the disclosure of which is incorporated herein in its entirety by reference thereto.
The present invention relates to a communication node, a multi-hop network, equipment validity check method, and a program.

BACKGROUND

There is a demand to use network services of wireless communications even in areas where no radio waves reach from wireless local area network (LAN) access points and services of wireless communication networks are not available. In this case, a wireless LAN access point (so-called "a base unit") having a multi-hop function can be used to expand the range of connection to the existing LAN.

PTL 1 discloses a wireless relay system which can prevent impersonation by an unauthorized communication terminal using a falsified media access control (MAC) address or identification address. PTL 1 discloses a wireless relay system that includes a plurality of wireless relay apparatuses 3 that perform relay processing in a multi-hop manner, a communication terminal 2 that is connected to a wireless relay apparatus 3, and a gateway apparatus 1 that relays communication data to a shopping server 7 as a communication destination specified by the communication terminal 2. When receiving a substitutive authentication request command from the communication terminal 2, the wireless relay apparatus 3 authenticates the communication terminal 2 by matching information about a path used until the gateway apparatus 1 receives the command against path information stored in advance in the gateway apparatus 1.

PTL 2 discloses an authentication apparatus that contributes to improvement in security and accuracy of authentication. Specifically, this authentication apparatus includes a plurality of information acquisition parts which acquire identification information used based on authentication methods different from each other and a storage part which holds authentication sequence information that is formed by a combinations of and an order of authentication elements. A set of an authentication method and matching information used with the information acquisition parts is used as a single authentication element. This authentication apparatus authenticates an individual authentication target based on the combinations and the order of authentication elements.

PTL 1: Japanese Patent Kokai Publication No. JP2013-201481A
PTL 2: Japanese Patent Kokai Publication No. JP2017-151759A

SUMMARY

The following analysis has been made by the present inventor. In the environment of a multi-hop network established by a wireless LAN access point having a multi-hop function, data transmitted from certain equipment to designated communication equipment are relayed and replied via a plurality of nodes. Thus, there is a possibility of data falsification, namely, so-called impersonation.

In addition, security vulnerabilities in the multi-hop network can be a threat to a upstream network of a base unit.

It is an object of the present invention to provide a communication node, a multi-hop network, an equipment validity check method, and a program that can contribute to improvement in security of an information system that uses a multi-hop network.

According to a first aspect, there is provided a communication node including at least one memory configured to store instructions; and at least one processor configured to execute the instructions. The instructions perform processing for relaying data between equipment communicating with each other via a multi-hop network based on a multi-hop manner, recording a predetermined kind(s) of data among the relayed data, checking validity of the equipment by matching the predetermined kind(s) of data against past data recorded by the recording part, and outputting a check result of the validity of the equipment to a predetermined output destination(s).

According to a second aspect, there is provided a multi-hop network including the above communication node.

According to a third aspect, there is provided an equipment validity check method, including: causing a communication node which relays data between equipment communicating with each other via a multi-hop network based on a multi-hop manner to record a predetermined kind(s) of data among the relayed data; causing the communication node to match the predetermined kind(s) of data against recorded past data and check validity of the equipment; and causing the communication node to output a check result of the validity of the equipment to a predetermined output destination(s). This method is associated with a certain machine referred to as a communication node which relays data between equipment communicating with each other via a multi-hop network based on a multi-hop manner.

According to a fourth aspect, there is provided a program, causing a computer mounted on a communication node which relays data between equipment communicating with each other via a multi-hop network based on a multi-hop manner to perform processing for: recording a predetermined kind(s) of data among the relayed data; matching the predetermined kind(s) of data against recorded past data and checking validity of the equipment; and checking validity of the equipment and outputting a check result of the validity of the equipment to a predetermined output destination(s). This program is inputted to a computer apparatus via an input device or a communication interface from the outside, is stored in a storage device, and drives a processor in accordance with predetermined steps or processing. In addition, as needed, this program can display its processing result including an intermediate state per stage via a display device or can communicate with the outside via the communication interface. A typical example of the computer apparatus for this purpose includes a processor, a storage device, an input device, a communication interface, and a display device as needed, which are connectable to each other via a bus.

The present invention can contribute to improvement in security of an information system that uses a multi-hop network.

BRIEF DESCRIPTION OF THE DRAWINGS

FIG. 6 illustrates an example of logging data according to the first exemplary embodiment of the present invention.

PREFERRED MODES

Figure 1:
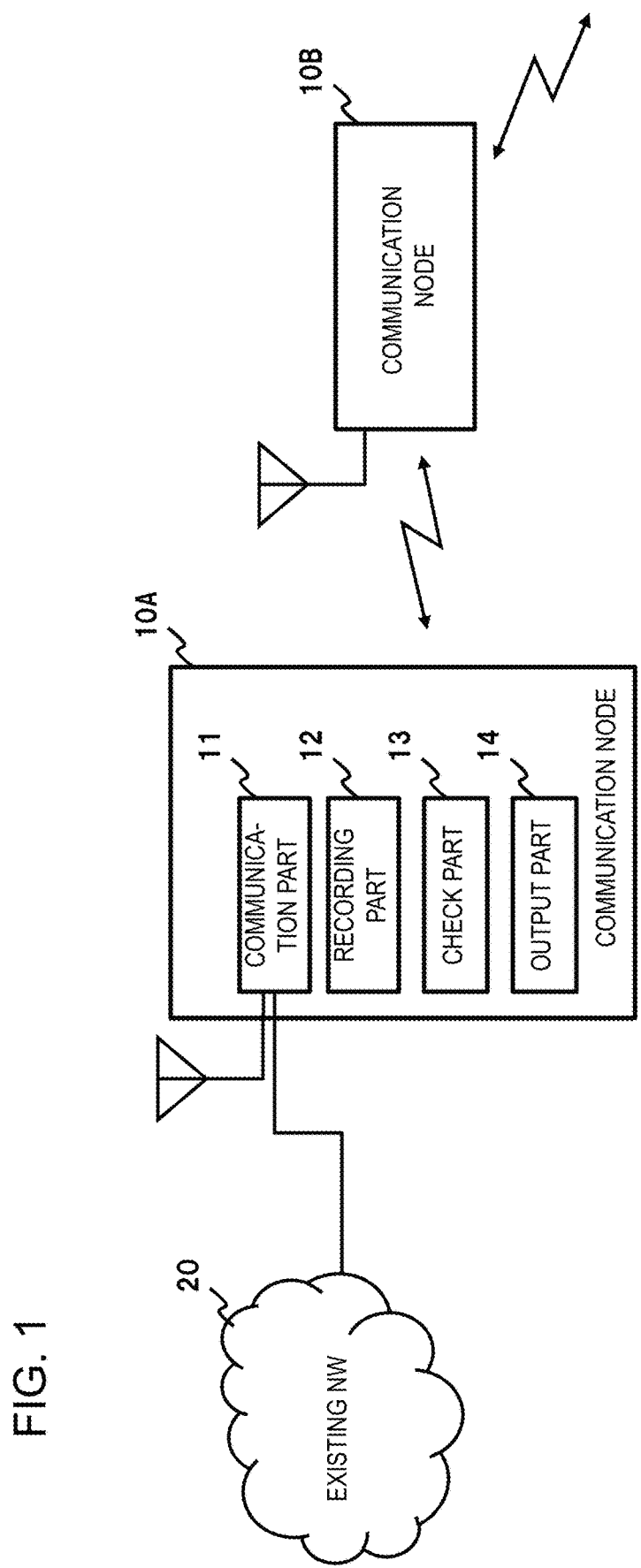
FIG. 1 illustrates a configuration according to an exemplary embodiment of the present invention.

First, an outline of an exemplary embodiment of the present invention will be described with reference to drawings. Reference characters in the following outline denote various elements for the sake of convenience and are used as examples to facilitate understanding of the present invention. Namely, the description of the outline is not intended to limit the present invention to the illustrated modes. An individual connection line between blocks in an individual drawing, etc. to which the following description refers signifies both one-way and two-way directions. An arrow schematically illustrates a principal signal (data) flow and does not exclude bidirectionality. This program is executed via a computer apparatus including, for example, a storage device, an input device, a communication interface, and a display device as needed. In addition, this computer apparatus is configured to communicate with equipment therein or external equipment (including a computer) via the communication interface based on wired or wireless connection. While not illustrated in the drawings, a port or an interface exists at an input or output connection point of an individual block diagram. In the following description, "A and/or B" signifies "A or B" or "A and B".

As illustrated in FIG. 1, an exemplary embodiment of the present invention can be realized by a communication node 10A that includes a communication part 11, a recording part 12, a check part 13, and an output part 14. The following description assumes that the communication node 10A is equipment that operates as an extension unit of a multi-hop network base unit installed in an existing network (existing NW) 20. In coordination with a communication node 10B, the communication node 10A relays data between equipment (not illustrated) connected to the existing network (existing NW) 20 and equipment (a terminal 30) connected to the communication node 10B.

More specifically, the communication part 11 relays data between the equipment communicating with each other via the multi-hop network based on a multi-hop manner. The recording part 12 records a predetermined kind(s) of data among the relayed data. Among data about the users' habits and behaviors or data that can be easily attacked, a kind(s) of data with which impersonation, etc. can be detected is selected as the predetermined kind(s) of data.

The check part 13 checks validity of the equipment by matching the predetermined kind(s) of data against past data recorded by the recording part. The output part 14 outputs a check result of the validity of the equipment to a predetermined output destination(s). Herein, "checking validity of the equipment" means checking not only validity of the equipment but also whether an appropriately authorized user (a worker or the like) is using the equipment.

Figure 2:
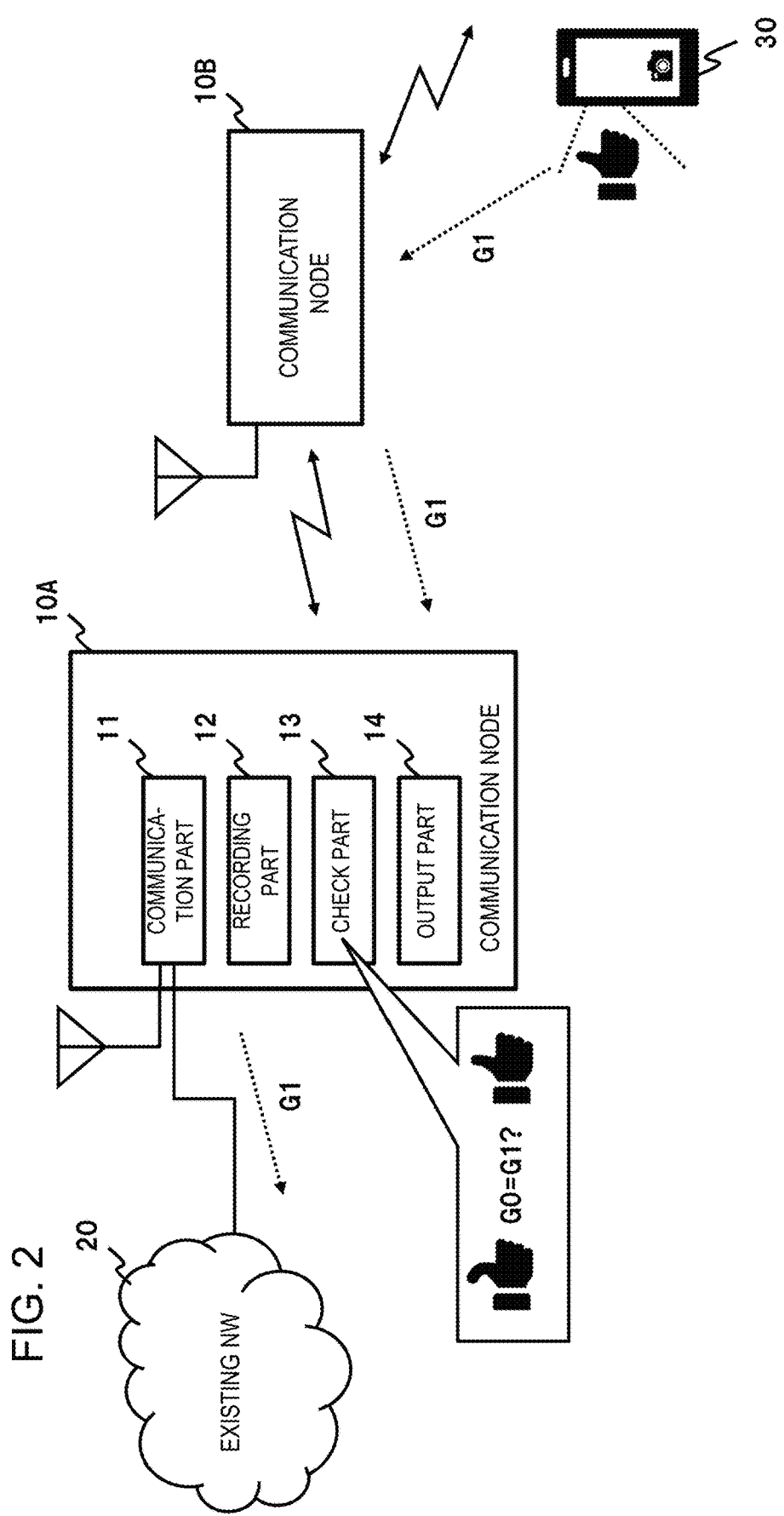
FIG. 2 illustrates an operation according to the exemplary embodiment of the present invention.

FIG. 2 illustrates an operation performed when gesture data captured by the terminal 30 is used as the predetermined kind of data. When the user of the terminal 30 captures an image of a gesture and transmits the image as gesture data G1 to the communication node 10B, the communication node 10B forwards the gesture data G1 to the communication node 10A.

When receiving the gesture data G1, the communication node 10A relays the gesture data G1 to the existing NW 20 and causes the recording part 12 to record (perform logging of) the gesture data G1.

In addition, the check part 13 matches the most recent gesture data G1 recorded by the recording part 12 against gesture data G0 transmitted from the terminal 30 last time and checks validity of the terminal 30. For example, if a thumbs-up gesture of the user is different from that recorded last time, the check part 13 determines that the validity of the terminal 30 cannot be confirmed. In this case, the output part 14 outputs the check result of the validity of the terminal 30 to a predetermined output destination(s) (the result indicating that there is a possibility of impersonation).

If the check part 13 has confirmed the validity of the terminal 30, the output part 14 may of course output the check result of the validity of the equipment to the predetermined output destination(s) (the result indicating that there is no possibility of impersonation).

Figure 3:
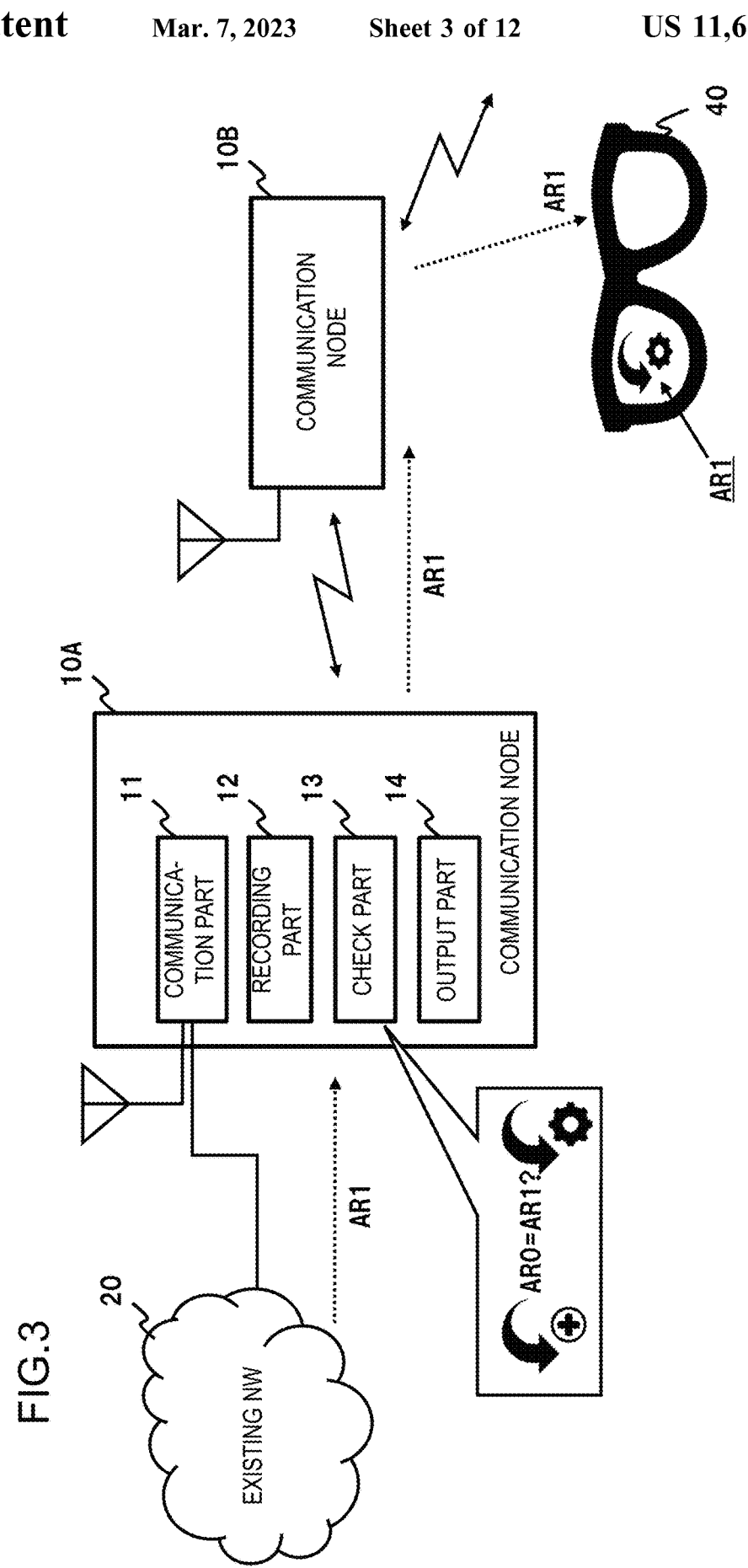
FIG. 3 illustrates another operation according to the exemplary embodiment of the present invention.

FIG. 3 illustrates an operation performed when augmented reality (AR) data transmitted from the existing NW 20 to smart glasses 40 is used as the predetermined kind of data. When equipment (for example, a work instruction server using AR) in the existing NW 20 transmits AR data AR1 to the communication node 10A, the communication node 10A forwards the AR data AR1 to the communication node 10B.

When receiving the AR data AR1, the communication node 10B transmits the AR data AR1 to the smart glasses 40.

In the above process, the recording part 12 of the communication node 10A records (performs logging of) the AR data AR1. The check part 13 of the communication node 10A matches the most recent AR data AR1 recorded by the recording part 12 against AR data AR0 transmitted from the existing NW 20 last time and checks the validity of the equipment (for example, the work instruction server using AR) in the existing NW 20. For example, if certain information (for example, an AR figure) included in the AR data AR1 differs from that recorded last time, the check part 13 determines that the validity of the equipment in the existing NW 20 cannot be confirmed. In this case, the output part 14 outputs the check result of the validity of the equipment in the existing NW 20 to a certain output destination(s) (the result indicating that there is a possibility of impersonation).

If the check part 13 has confirmed the validity of the equipment in the existing NW 20, the output part 14 may of course output the check result of the validity of the equipment in the existing NW 20 to the predetermined output destination(s) (the result indicating that there is no possibility of impersonation).

As described above, according to the present exemplary embodiment, security of a multi-hop network can be improved by performing authentication using data recorded in the multi-hop network, in addition to normal authentication processing performed between equipment.

FIRST EXEMPLARY EMBODIMENT

Figure 4:
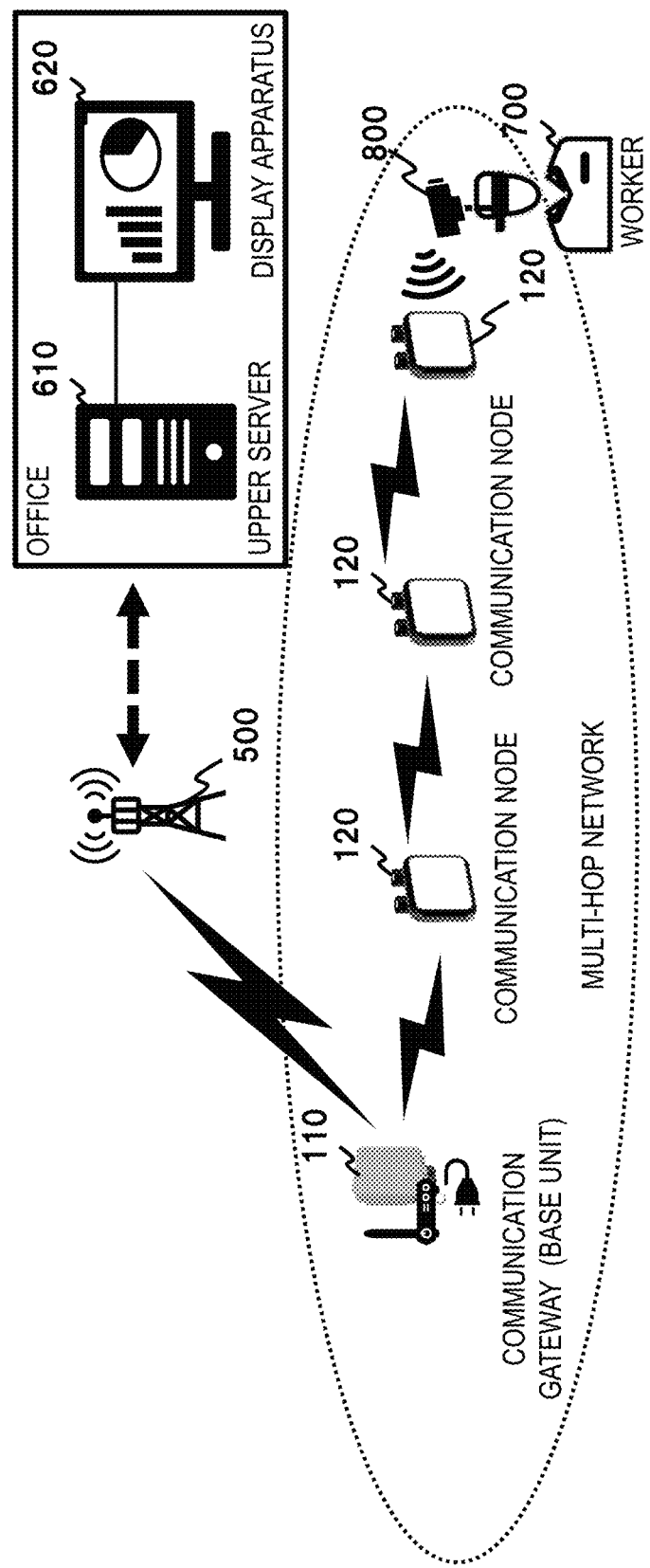
FIG. 4 illustrates a configuration according to a first exemplary embodiment of the present invention.

Next, a first exemplary embodiment of the present invention will be described in detail with reference to drawings. FIG. 4 illustrates a configuration according to the first exemplary embodiment of the present invention. FIG. 4 illustrates a configuration in which an office in which an upper server 610 and a display apparatus 620 are installed, a base station 500, and a multi-hop network including a communication gateway (a base unit) 110 are connected to each other.

The multi-hop network includes the communication gateway (the base unit) 110 and a plurality of communication nodes (extension units) 120 and provides a device 800, which is located in an area where radio waves of the base station 500 do not reach, with an environment in which the device 800 can connect to the upper server 610. Wireless local area network (LAN) access points having a multi-hop relay function can be used as constituent equipment of this multi-hop network. In either case, a network connection environment can be provided to an area such as a plant, inside of a building, a headrace, a conducting pipe, or a sewer pipe where radio waves of a base station or a wireless LAN access point do not reach.

The base station 500 is a base station of a mobile network operator that provides services based on 3G, Long Term Evolution (LTE), 5G, etc.

The upper server 610 is equipment that transmits work assisting information referred to as "work utilization data" (corresponding to "work instruction data") via the base station 500 and the multi-hop network through the Internet or the like to the device 800. The display apparatus 620 is equipment used as a message display destination when impersonation of the device is detected. The present exemplary embodiment will be described assuming that the work utilization data is information created by using virtual reality (VR), AR, or mixed reality (MR) for supporting work of a worker 700.

The device 800 is a terminal such as a wearable terminal as typified by smart glasses or a smartphone. When the worker 700 logs in the upper server 610 via the multi-hop network and makes a gesture by using the device 800, the device 800 can acquire work utilization data from the upper server 610 and display the work utilization data. The present exemplary embodiment assumes that the work utilization data is displayed based on a method compatible with VR, AR, or MR. Of course, the "work utilization data" may be outputted via text or audio from a display device or a speaker of the device without using VR, AR, or MR.

Figure 5:
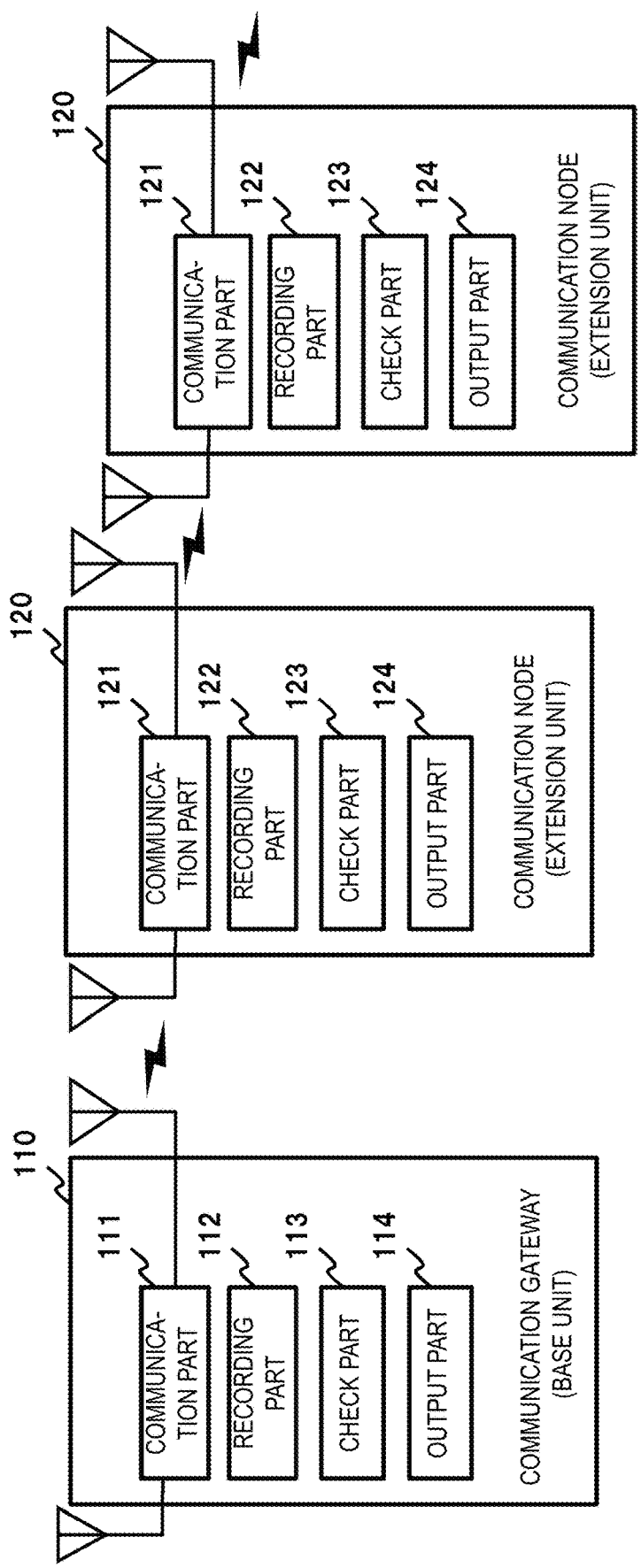
FIG. 5 is a functional block diagram illustrating configurations of a communication gateway (a base unit) and an individual communication node constituting a multi-hop network according to the first exemplary embodiment of the present invention.

FIG. 5 is a functional block diagram illustrating configurations of the communication gateway (the base unit) and the individual communication node constituting the multi-hop network. As illustrated in FIG. 5, the communication gateway (the base unit) 110 includes a communication part 111, a recording part 112, a check part 113, and an output part 114.

The communication part 111 relays data between the upper server 610 and the device 800 based on a multi-hop manner.

The recording part 112 records a predetermined kind(s) of data among the relayed data. This recorded data will hereinafter be referred to as logging data. In the present exemplary embodiment, an operation gesture imaged by the device 800 and transmitted to the upper server 610 (corresponding to "equipment operation gesture data") and the work utilization data transmitted from the upper server 610 to the device 800 are recorded. In addition, the recording part 112 records, in addition to the above data, the path data of the predetermined kind of data as "route tag data" (forwarding path information). In the present exemplary embodiment, the recording part 112 records the path data of work result data transmitted from the worker 700 to the upper server 610 after the worker 700 completes his/her work.

FIG. 6 illustrates an example of the logging data held in the recording part 112. The top table in FIG. 6 stores an individual entry including a user ID, a system ID for determining the upper server 610, use date and time, and logging data (operation gesture data), which are associated with each other. The bottom table in FIG. 6 stores an individual entry including a system ID, a user ID, use date and time, and logging data (work utilization data), which are associated with each other. The user ID is a worker (user) ID used as information for determining the device 800. The system ID is a server ID used as information for determining the upper server 610. The use date and time is date and time when logging is performed. As the logging data, feature data of an operation gesture or work utilization data is stored.

The check part 113 matches most recent logging data against past logging data and checks validity of equipment based on whether a significant difference is recognized between these two data. For example, if there is a significant difference between the movement, color, shape or background of a hand that appears in the most recent operation gesture transmitted from the device 800 to the upper server 610 and the corresponding information that appears in a past operation gesture, the check part 113 can determine that there is a possibility of impersonation. For example, this significant difference between the operation gestures attributes to a habit of the worker about the speed or inclination of the hand movement or to the difference in the color, shape, background, etc. of the hand. From this difference, the check part 113 can determine any operation gesture that may not have been performed by the target worker.

Likewise, for example, if there is a significant difference between the movement of an image or the shape or color of a figurative element that appears in a VR, AR, MR image of the most recent work utilization data transmitted from the upper server 610 to the device 800 and the corresponding information that appears in past work utilization data, the check part 113 can determine that there is a possibility of impersonation. For example, this significant difference between the work utilization data attributes to the difference in the digital image itself synthesized on the worker's visual field by AR or in text or audio outputted with the digital image. From this difference, the check part 113 can determine any work utilization data that may not have been transmitted by the upper server 610.

In addition, the check part 113 determines whether the route tag data of work result data matches the route tag data of past work result data transmitted by the corresponding device 800, to check validity of the equipment. For example, if the work result data is transmitted on a path different from a path from the original work location, the device 800 determines that there is a possibility of impersonation.

If abnormality is recognized as a result of the validity check by the check part 113, the output part 114 (corresponding to the above output part 14) transmits a message to a predetermined output destination apparatus(es). According to the present exemplary embodiment, the output part 114 transmits a message, namely, the equipment validity check result, not only to the display apparatus 620 connected to the upper server 610 but also to terminals of system administrators 1 and 2, who are superiors or supervisors of the worker. Specific contents of the message will be described below with description of operations.

An individual communication node (an extension unit) 120 includes a communication part 121, a recording part 122, a check part 123, and an output part 124. Since the communication part 121, the recording part 122, the check part 123, and the output part 124 of the communication node (extension unit) 120 are equivalent to the communication part 111, the recording part 112, the check part 113, and the output part 114 of the communication gateway (base unit) 110, description thereof will be omitted. Thus, the communication gateway (the base unit) 110 and the plurality of communication nodes (the extension units) 120 correspond to the above communication nodes.

Figure 7:
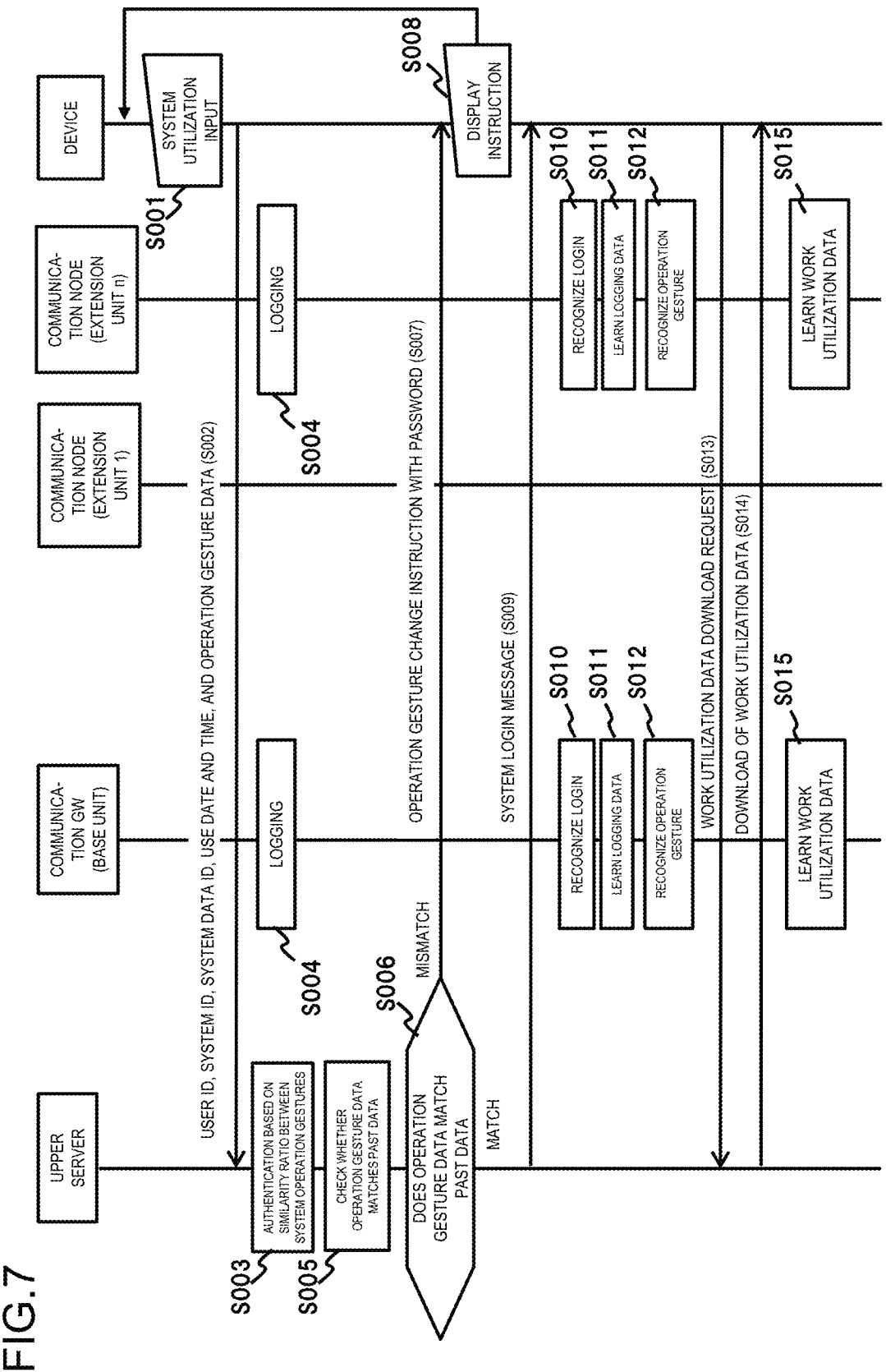
FIG. 7 illustrates an operation (data learning) according to the first exemplary embodiment of the present invention.

Next, operations according to the present exemplary embodiment will be described in detail with reference to drawings. FIG. 7 is a sequence diagram illustrating data learning processing performed before an operation of the multi-hop network is started according to the present exemplary embodiment. The following description will be made based on an example in which the device 800 accesses the upper server 610 by connecting to the nth extension unit (an extension unit n).

As illustrated in FIG. 7, first, the user performs system utilization input on the device 800 (step S001). This example assumes that the user inputs a user ID, a system ID, a system data ID, use date and time, and operation gesture data. The system data ID is an ID for determining the data provided from the upper server 610. For example, the user sets an ID for determining data (a content) such as day 3 of first-period foundation construction of premise of subway station XX (provisional name) or day 2 of construction of exterior (east side) of premise of power plant YY.

When receiving the input in the system utilization input, the device 800 transmits the user ID, the system ID, the system data ID, the use date and time, and the operation gesture data to the upper server 610 (step S002).

The upper server 610 identifies the user by referring to the user ID and performs authentication based on the operation gesture data (step S003). In this authentication, the upper server 610 calculates the similarity ratio between a previously registered operation gesture of the worker 700 and the most recent operation gesture data. If the similarity ratio is equal to or more than a predetermined score, the upper server 610 may determine successful authentication.

The communication gateway (hereinafter referred to as a communication GW) 110 and the communication node(s) that have relayed the data received in the above system utilization input perform logging of the relayed data (see step S004 in FIG. 6). In FIG. 7, the logging processing by the communication node (extension unit 1) is omitted. There is no need to have all the communication nodes perform this logging processing. Some of the communication nodes may omit the logging processing.

If the upper server 610 according to the present exemplary embodiment holds past operation gesture data, the upper server 610 checks whether the operation gesture data matches the past data (step S005).

As a result of the check, if the operation gesture data does not match the past data, the upper server 610 transmits an operation gesture change instruction with a password to the device 800 (step S007). This "operation gesture change instruction with a password" is a message that allows browsing of an operation gesture change instruction on the condition that a previously set password is inputted. Thus, since the operation gesture change content cannot be browsed if the device 800 is impersonated in the learning stage, registration of an unauthorized user can be prevented.

If the password is inputted successfully, the operation gesture change instruction is displayed on the device 800 (step S008). When browsing the operation gesture change instruction, the worker 700 performs the system utilization input in step S001, again (step S001).

In step S006, if the operation gesture data matches the past data, the upper server 610 transmits a system login message indicating completion of the login to the system to the device 800 (step S009).

Each of the communication GW 110 and the communication node(s) 120 that have relayed the system login message recognizes that the device 800 has successfully logged in the system (step S010, recognition of login). Next, the communication GW 110 and the communication node(s) 120 learn the logging data in step S004 (step S011). In addition, the communication GW 110 and the communication node(s) 120 recognize the operation gesture data and perform processing corresponding to the operation gesture data, if necessary (step S012).

When receiving the system login message, the device 800 requests the upper server 610 for the download of work utilization data (step S013). When receiving the work utilization data download request, the upper server 610 transmits the work utilization data to the device 800 (step S014; download of work utilization data).

Each of the communication GW 110 and the communication node(s) 120 that have relayed the work utilization data performs logging of the work utilization data (step S015).

In this way, the learning data (past data) necessary for the validity check of the device 800 is accumulated.

Figure 8:
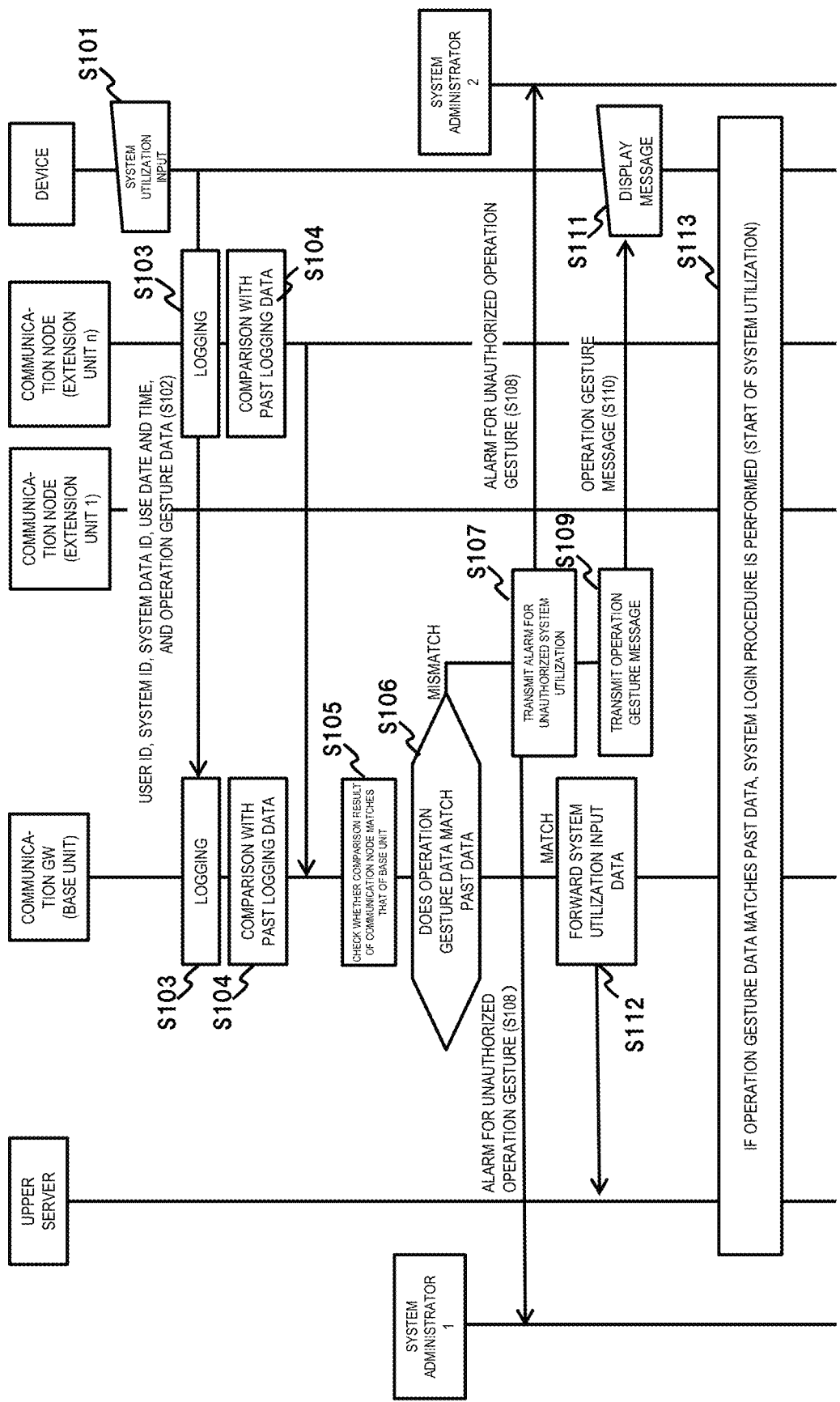
FIG. 8 illustrates an operation (verification of an operation gesture at an actual operation) according to the first exemplary embodiment of the present invention.

FIG. 8 illustrates an example of an operation gesture verification operation performed by an individual apparatus when an actual operation is started after the above data learning processing. As illustrated in FIG. 8, first, the user performs system utilization input on the device 800 (step S101). This system utilization input is the same as that described in step S001 in FIG. 7.

When receiving the system utilization input, the device 800 transmits a user ID, a system ID, a system data ID, use date and time, and operation gesture data to the upper server 610 (step S102).

If the communication GW 110 and the communication node(s) that have relayed the data received in the system utilization input have received data including operation gesture data, each of the communication GW 110 and the communication node(s) performs logging of the relayed data (see step S103 in FIG. 6).

Next, each of the communication GW 110 and the communication node(s) 120 compares past logging data with the data received in step S102 and checks whether these data match (step S104). The communication node(s) 120 transmits its check result to the communication GW 110.

If at least one of the communication GW 110 and the communication node(s) 120 determines that the operation gesture data do not match the past data, the communication GW 110 transmits an alarm for unauthorized system utilization to the terminals of the system administrators 1 and 2 (steps S107 and S108). The present exemplary embodiment assumes that the system administrator 1 is a manage of the office in which the upper server 610 is installed and that the system administrator 2 is a manager of the worker 700. Any alarm for unauthorized system utilization may be used as long as the alarm notifies the managers of a possibility of "impersonation" of the device 800. An appropriate mode such as a short message service (SMS), mail, or a voice call may be adopted as the alarm for unauthorized system utilization.

After transmitting the alarm for unauthorized system utilization to the terminals of the system administrators 1 and 2, the communication GW 110 transmits an operation gesture message to the device 800 (step S109 and S110). Any operation gesture message may be used as long as the message notifies that there is a problem with the operation gesture. This operation gesture message does not need to indicate any detailed determination result. When receiving the operation gesture message, the device 800 displays the operation gesture message. If the worker 700 is a true and correct worker, the worker 700 becomes aware that he or she has made a different gesture than usual and performs the system utilization input, again. However, if the worker 700 is not a true and correct worker, even if the worker 700 becomes aware that he or she has made a different gesture than usual, the worker 700 does not know what is wrong with the gesture. Thus, even if the worker 700 performs the system utilization input again, the worker 700 cannot successfully log in the system.

In contrast, in step S106, if the operation gesture data matches the past data, the communication GW 110 forwards the system utilization input data to the upper server 610 (step S112). Hereinafter, a system login procedure using the system utilization input data is performed (step S113; start of system utilization). Specifically, as in step S003, the upper server 610 identifies the user by referring to the user ID and performs authentication based on the operation gesture data.

As described above, according to the present exemplary embodiment, impersonation can be detected by using operation gesture data transmitted from the device 800 to the upper server when system utilization is started. In addition, this determination is performed from a viewpoint different from operation gesture data in the upper server 610. If there is a problem, since transmission of system utilization input data to the upper server 610 is prevented, the present exemplary embodiment is effective as measures for denial-of-service (DoS) attacks against the upper server 610. The determination of operation gesture data, etc. may be performed from a different viewpoint in the communication GW 110 and the communication node(s) 120. For example, since the processing capabilities of a memory or a processor of the communication node(s) 120 are not as good as those of the communication GW 110, the communication node(s) 120 may perform more simplified determination than the communication GW 110. In the example in FIG. 7, while both the communication GW 110 and the communication node 120 determine whether the operation gesture data matches the past data, only one of the communication GW 110 and the communication node 120 may perform this determination. For example, only one of the communication GW 110 and the communication node 120 may determine whether the operation gesture data matches the past data.

Figure 9:
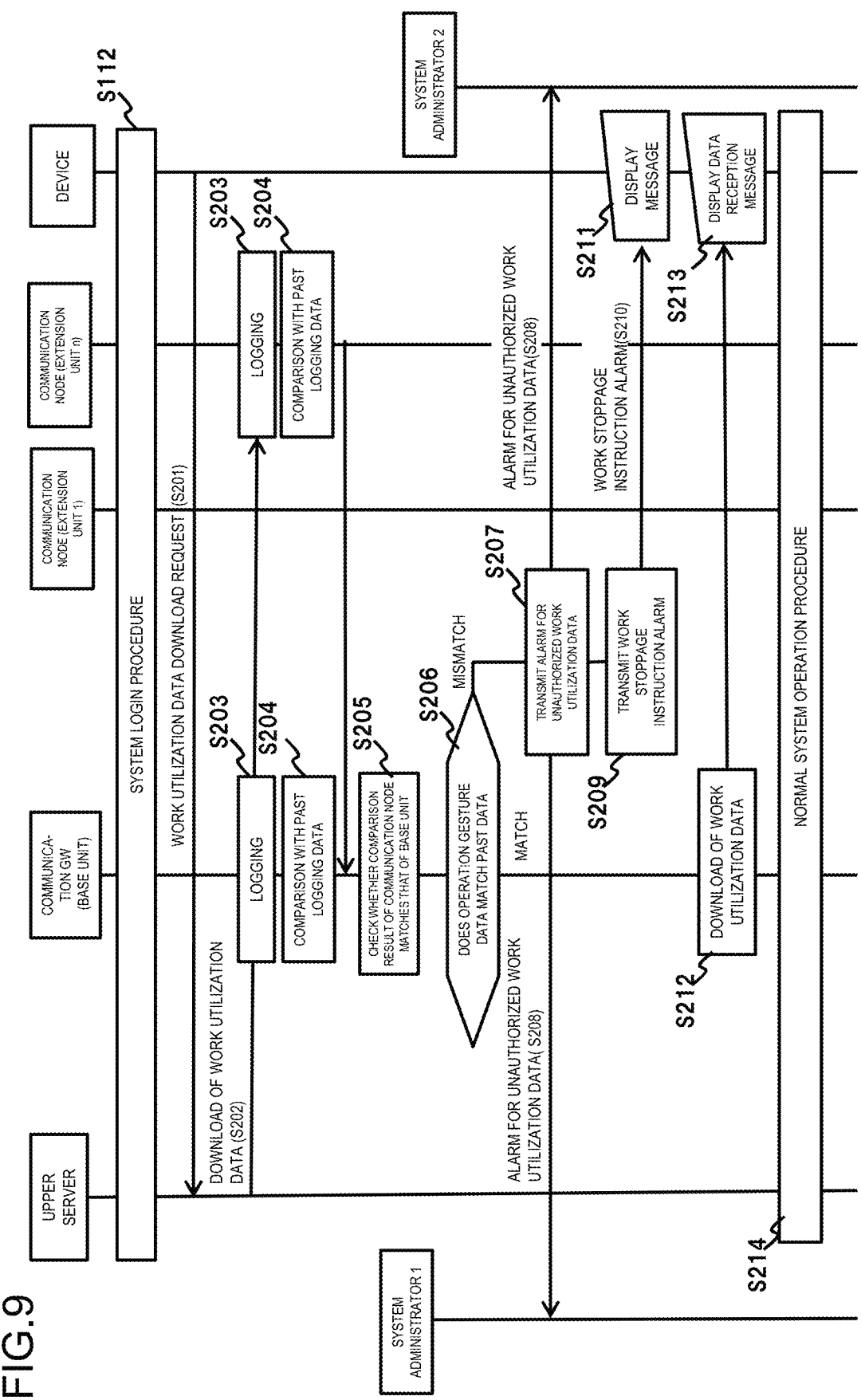
FIG. 9 illustrates an operation (verification of work utilization data at an actual operation) according to the first exemplary embodiment of the present invention.

In addition, according to the present exemplary embodiment, work utilization data transmitted from the upper server 610 to the device 800 is verified. FIG. 9 illustrates an example of work utilization data verification operation performed by an individual apparatus after the above system login. As illustrated in FIG. 9, first, the device 800 transmits a work utilization data download request to the upper server 610 (step S201). When receiving the download request, the upper server 610 transmits work utilization data to the communication GW 110 in response to the work utilization data download request (step S202).

When each of the communication GW 110 and the communication node(s) that have relayed the work utilization data receives the work utilization data, each of the communication GW 110 and the communication node(s) performs logging of the received work utilization data (see step S203 in FIG. 6).

Next, each of the communication GW 110 and the communication node(s) 120 compares past logging data with the data received in step S202 and checks whether these data match (step S204). In the check in step S204, if sequence numbers are allocated to the data, the consistency of the sequence numbers may be verified. For example, if the data received in step S202 has a younger sequence number (older in terms of time) than that of the past logging data, there is a possibility that the received work utilization data is unauthorized work utilization data. The communication node(s) 120 transmits the check result to the communication GW 110.

If at least one of the communication GW 110 and the communication node(s) 120 determines that the work utilization data do not match the past data, the communication GW 110 transmits an alarm for unauthorized work utilization data to the terminals of the system administrators 1 and 2 (steps S207 and S208). The present exemplary embodiment assumes that the system administrator 1 is a manage of the office in which the upper server 610 is installed and that the system administrator 2 is a manager of the worker 700. Any alarm for unauthorized work utilization data may be used as long as the alarm notifies the managers of a possibility that a node different from the upper server 610 has transmitted the work utilization data. An appropriate mode such as a short message service (SMS), mail, or a voice call may be adopted as the alarm for unauthorized work utilization data.

After transmitting the alarm for unauthorized work utilization data to the terminals of the system administrators 1 and 2, the communication GW 110 transmits a work stoppage instruction alarm to the device 800 (steps S209 and S210). Any work stoppage instruction alarm may be used as long as the alarm notifies the device 800 of a possibility that the work utilization data has not been transmitted by the upper server 610. When receiving the work stoppage instruction alarm, the device 800 displays the work stoppage instruction alarm. When receiving the alarm, the worker 700 stops work by using the work utilization data. Even if the worker 700 has already started work by using the work utilization data that the worker 700 had already received, if the worker 700 receives the work stoppage instruction alarm at certain timing, since there is a possibility that impersonation has been performed at some time, it is preferable that the worker 700 stop the work by using the work utilization data.

In contrast, in step S206, if the work utilization data matches the past data, the communication GW 110 forwards the work utilization data to the device 800 (step S212). When receiving the work utilization data, the device 800 displays a data reception message (step S213) and waits for the worker 700 to input an operation regarding the work utilization data. Subsequently, in the same procedure, after a work utilization data download request is made and whether there is a possibility of impersonation is determined based on matching between work utilization data and past data, authorized work utilization data is transmitted to the device (step S214; normal system operation procedure).

As described above, according to the present exemplary embodiment, impersonation can be detected by using work utilization data transmitted from the upper server 610 to the device 800. For example, even when a person with malicious intent transmits fake work utilization data to the worker 700 to have the worker 700 do erroneous work, this fake work utilization data can be detected by the communication GW 110 and the communication node(s) 120. In particular, depending on the device 800, a memory or calculation processing capacities are often limited. Even if the device 800 has the sufficient resources, in many cases it is not appropriate to consume resources for impersonation detection. The present exemplary embodiment can exhibit its advantageous effect more effectively in such cases.

Figure 10:
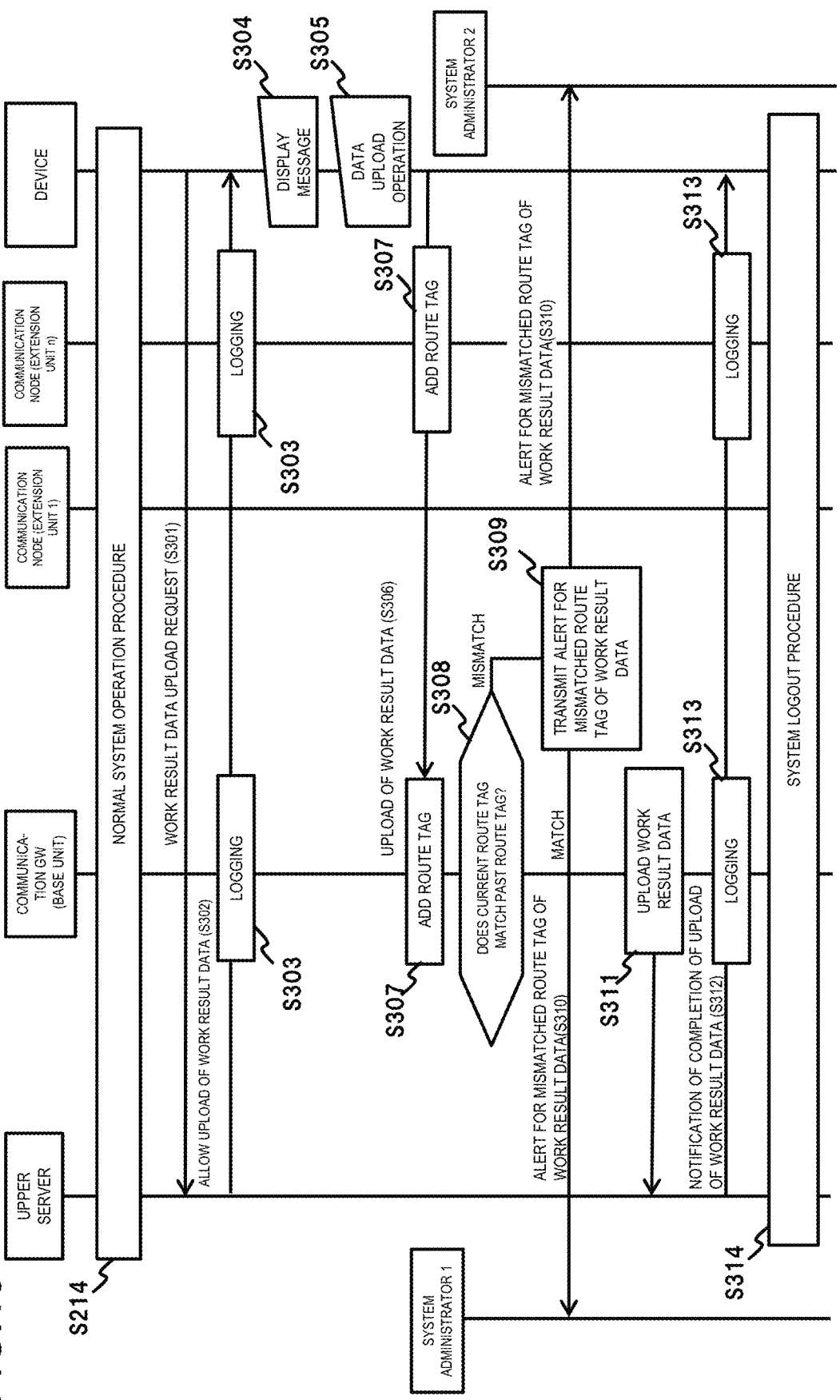
FIG. 10 illustrates an operation (verification of work result data at an actual operation) according to the first exemplary embodiment of the present invention.

In addition, according to the present exemplary embodiment, after work is completed, work result data transmitted from the device 800 to the upper server 610 is verified. FIG. 10 illustrates an example of a work result data verification operation. As illustrated in FIG. 10, first, the device 800 transmits a work result data upload request to the upper server 610 (step S301). When receiving the upload request, the upper server 610 transmits a message that allows the upload of the work result data to the device 800 (step S302).

The communication GW 110 and the communication node(s) 120 that have relayed the message that allows the upload of the work result data perform logging of this exchange between the upper server 610 and the device 800 (step S303).

When receiving the message that allows the upload of the work result data, the device 800 displays the message that allows the upload of the work result data (step S304). When the worker 700 checks this message and performs a work result data upload operation, the upload of the work result data is started (step S305).

When relaying the work result data, each of the communication GW 110 and the communication node(s) 120 adds a route tag to the work result data and records the route tag (steps S306 and S307). This route tag can be configured by causing each of the communication GW 110 and the communication node(s) 120 on the work result data forwarding path to add its own ID as a tag.

Next, the communication GW 110 compares the route tag of the individual past work result data with the route tag of the current work result data to check whether these tags match (step S308).

As a result of the checking, if the communication GW 110 determines that the route tag of the work result data does not match the past route tag, the communication GW 110 transmits an alert for this mismatched route tag of the work result data to the terminals of the system administrators 1 and 2 (steps S309 and S310). The alert for the mismatched route tag may be transmitted to the same destination(s) of the alarm for unauthorized work utilization data. Any alert for the mismatched route tag may be used as long as the alert notifies the managers of a possibility that the work result data has been transmitted from an inappropriate location. An appropriate mode such as a short message service (SMS), mail, or a voice call may be adopted as the alert for the mismatched route tag.

In contrast, if the route tag of the work result data matches the past data in step S308, the communication GW 110 forwards the work result data to the upper server 610 (step S311). When receiving the work result data, the upper server 610 transmits a message that notifies the device 800 of completion of the upload of the work result data (step S312; notification of completion of upload of work result data).

The communication GW 110 and the communication node(s) 120 that have relayed the message that notifies the device 800 of completion of the upload of the work result data perform logging of the exchange, which includes the work result data, etc., between the upper server 610 and the device 800 (step S313).

Next, a system logout completion procedure is performed between the upper server 610 and the device 800 (step S314).

As described above, according to the present exemplary embodiment, unauthorized transmission of work result data from the device 800 to the upper server 610 can be detected. For example, even if a person with malicious intent transmits work result from a location different from a normal location, this transmission can be detected and an alert can be outputted before the work result data is forwarded to the upper server 610.

In the above exemplary embodiment, while impersonation detection is directed to operation gesture data, work utilization data, and work result data, logging of other data may be performed, and the other data may be compared with the corresponding past data. In this way, for example, impersonation of the other data can be detected.

SECOND EXEMPLARY EMBODIMENT

In the above first exemplary embodiment, regarding operation gesture data and work utilization data, while impersonation detection (validity check) is performed by matching logging data against the corresponding past data, route tag data may be recorded as needed for operation gesture data and work utilization data, too. In this way, regarding the operation gesture data and the work utilization data, too impersonation detection (validity check) can also be performed by using both logging data and route tag data.

Figure 11:
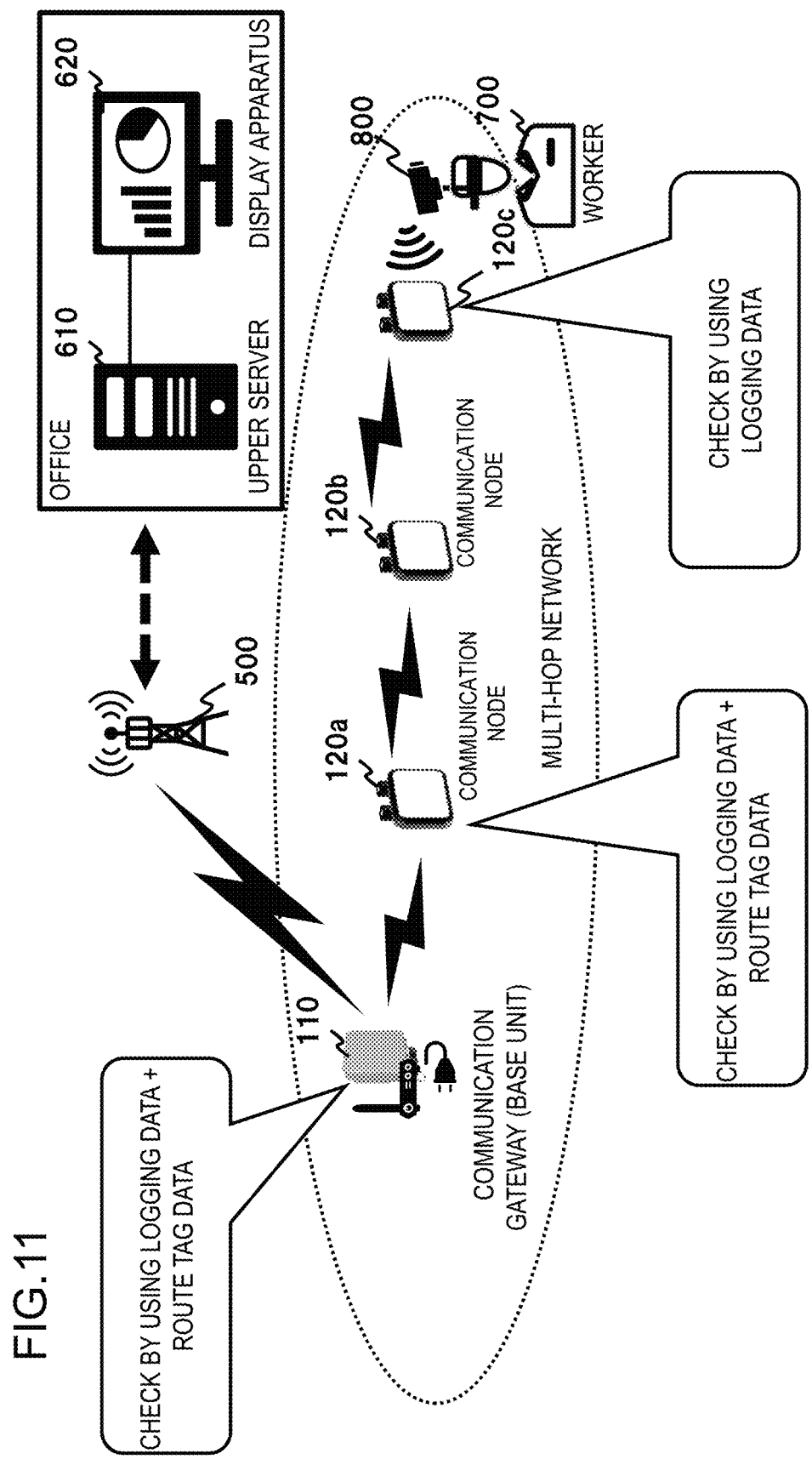
FIG. 11 illustrates a configuration and an operation according to a second exemplary embodiment of the present invention.

FIG. 11 illustrates a configuration and an operation according to a second exemplary embodiment. Since a basic configuration according to the second exemplary embodiment is the same as that according to the first exemplary embodiment, the following description will be made with a focus on the difference between the first and second exemplary embodiments.

In the example in FIG. 11, a communication GW 110 and a communication node 120a perform impersonation detection (validity check) using both logging data and route tag data. This impersonation detection (validity check) can be performed from a viewpoint of whether transmission is made from the correct location of the device 800 (the start point of the path), as in the verification of work result data according to the first exemplary embodiment. In addition, in the example in FIG. 11, impersonation detection (validity check) by a communication node 120b is omitted. Namely, neither logging data nor route tag data is recorded by the communication node 120b. When a communication node does not have much calculation resources, the communication node may skip the impersonation detection (validity check), as is the case with the communication node 120b.

In addition, in the example in FIG. 11, a communication node 120c performs impersonation detection (validity check) using logging data. This is because the communication node 120c is located at an edge of the multi-hop network (in a direction away from the base unit) and could not obtain route tag data having a certain length regarding uplink data.

As described above, whether the route tag data is additionally used may be changed (set), depending on the locations and performances of the communication GW 110 and the communication node(s) 120.

Whether the route tag data is additionally used may be set, depending on the level security needed for the multi-hop network. For example, when the multi-hop network can be used by guest users, high-level security management may not be necessary. In these cases, the communication GW 110 performs impersonation detection (validity check), the communication nodes 120 may skip impersonation detection (validity check).

While exemplary embodiments of the present invention have thus been described, the present invention is not limited thereto. Further variations, substitutions, or adjustments can be made without departing from the basic technical concept of the present invention. For example, the configurations of the networks and the elements and the representation modes of the messages illustrated in the drawings have been used only as examples to facilitate understanding of the present invention. The present invention is not limited to the configurations illustrated in the drawings.

Figure 12:
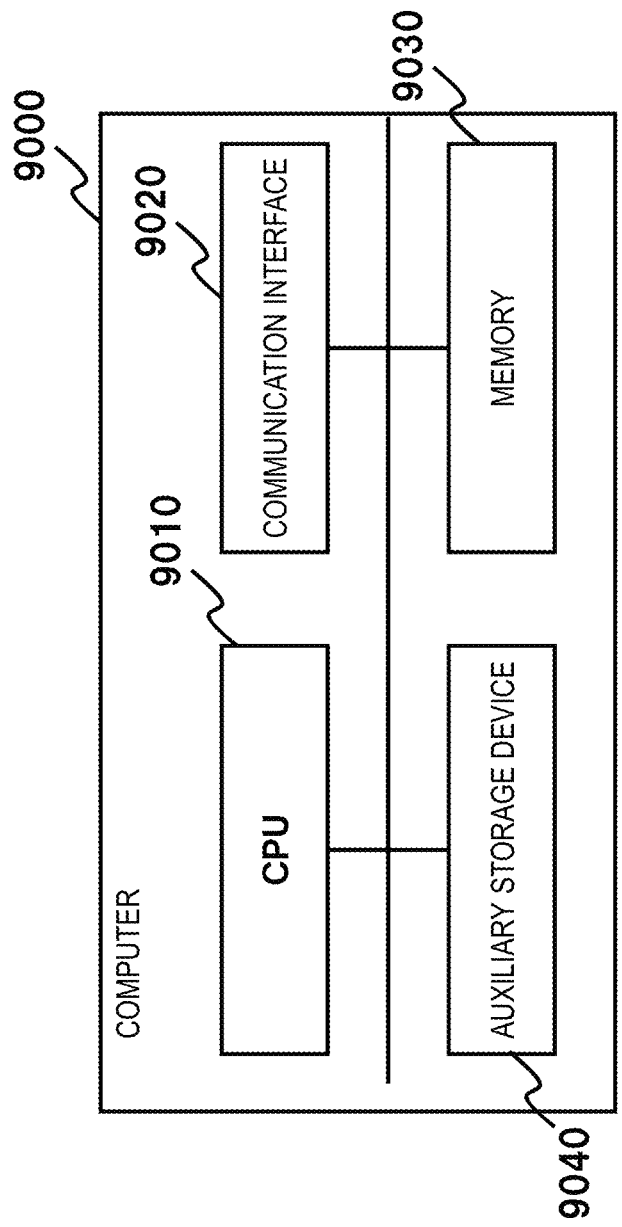
FIG. 12 illustrates a configuration of a computer mounted on a communication node according to the present invention.

In addition, an individual one of the procedures according to the above first and second exemplary embodiments can be realized by a program that causes computers (9000 in FIG. 12) mounted on the communication GW 110 and the communication node(s) 120 to realize the functions as these apparatuses. For example, an individual one of these computers includes a central processing unit (CPU) 9010, a communication interface 9020, a memory 9030, and an auxiliary storage device 9040 as illustrated in FIG. 12. The CPU 9010 in FIG. 12 executes the program and performs processing for updating various calculation parameters stored in the auxiliary storage device 9040, for example.

In other words, individual parts (processing means, functions) of an individual one of the communication GW 110 and the communication nodes 120 described in the above exemplary embodiment can be realized by a computer program that causes a processor mounted on the corresponding apparatus to perform the corresponding processing by using its hardware.

Finally, preferable modes of the present invention will be summarized.

[Mode 1]
(See the communication node according to the above first aspect)

[Mode 2]
Regarding the above communication node, equipment operation gesture data transmitted from one equipment to the other equipment is recorded as the predetermined kind(s) of data.

[Mode 3]
Regarding the above communication node, the instruction includes processing for determining that impersonation has been performed if there is a significant difference in characteristics of a gesture in the equipment operation gesture data.

[Mode 4]
Regarding the above communication node, work instruction data transmitted from one equipment to the other equipment is recorded as the predetermined kind(s) of data.

[Mode 5]
Regarding the above communication node, the instruction includes processing for determining that impersonation has been performed if there is a significant difference in a work instruction in the work instruction data.

[Mode 6]
Regarding the above communication node, the instruction includes processing for recording forwarding path information (route tag data) of the predetermined kind(s) of data, and checking validity of the equipment by checking a forward path of the data.

[Mode 7]
Regarding the above communication node, the instruction includes processing for receiving a check result of validity of the equipment from another communication node, and checking validity of the equipment by using the check result of validity of the equipment received from the another communication node.

[Mode 8]
(See the multi-hop network according to the above second aspect)

[Mode 9]
(See the equipment validity check method according to the above third aspect)

[Mode 10]
(See the program according to the above fourth aspect)

The above modes 8 to 10 can be expanded in the same way as mode 1 is expanded to modes 2 to 7.

The disclosure of each of the above PTLs is incorporated herein by reference thereto and can be used as the basis or a part of the present invention as needed. Modifications and adjustments of the exemplary embodiments and examples are possible within the scope of the overall disclosure (including the claims) of the present invention and based on the basic technical concept of the present invention. Various combinations and selections (including partial deletion) of various disclosed elements (including the elements in each of the claims, exemplary embodiments, examples, drawings, etc.) are possible within the scope of the disclosure of the present invention. The present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed. In addition, as needed and based on the gist of the present invention, partial or entire use of the individual disclosed matters in the above literatures that have been referred to as a part of the disclosure of the present invention in combination with what is disclosed in the present application should be deemed to be included in what is disclosed in the present application.

REFERENCE SIGNS LIST

10A, 10B communication node
11, 111, 121 communication part
12, 112, 122 recording part
13, 113, 123 check part
14, 114, 124 output part
20 existing network (existing NW)

30 terminal
40 smart glasses
110 communication gateway (base unit)
120, 120a to 120c communication node
610 upper server
620 display apparatus
500 base station
700 worker
800 device
9000 computer
9010 CPU
9020 communication interface
9030 memory
9040 auxiliary storage device
G0, G1 gesture data
AR1, AR1 AR data

What is claimed is:

1. A communication node, comprising:
at least one memory configured to store instructions; and
at least one processor configured to execute the instructions to perform processing for:
relaying data between equipment communicating with each other via a multi-hop network based on a multi-hop manner;
recording a predetermined kind(s) of data among the relayed data;
checking validity of the equipment by matching the predetermined kind(s) of data against recorded past data; and
outputting a check result of the validity of the equipment to a predetermined output destination(s).

2. The communication node according to claim 1; wherein the predetermined kind(s) of data is equipment operation gesture data transmitted from one equipment to the other equipment.

3. The communication node according to claim 2; the instruction including processing for:
determining that impersonation has been performed based on whether or not there is a significant difference in characteristics of a gesture in the equipment operation gesture data.

4. The communication node according to claim 1; wherein the predetermined kind(s) of data is work instruction data transmitted from one equipment to the other equipment.

5. The communication node according to claim 4; the instruction including processing for:
determining that impersonation has been performed based on whether or not there is a significant difference in a work instruction in the work instruction data.

6. The communication node according to claim 1; the instruction including processing for:
recording forwarding path information of the predetermined kind(s) of data; and
checking validity of the equipment that has transmitted the data by checking a forward path of the data.

7. The communication node according to claim 1; the instruction including processing for:
receiving a check result of validity of the equipment from another communication node; and
checking validity of the equipment by using the check result of validity of the equipment from the another communication node.

8. A multi-hop network comprising:
a communication node wherein the communication node relays data between equipment communicating with each other via a multi-hop network based on a multi-hop manner, records a predetermined kind(s) of data among the relayed data, checks validity of the equipment by matching the predetermined kind(s) of data against recorded past data, and outputs a check result of the validity of the equipment to a predetermined outputs destination(s).

9. The multi-hop network comprising the communication node according to claim 8; wherein, depending on a location of the communication node, the communication node uses a different method to check validity of the equipment.

10. The multi-hop network comprising the communication node according to claim 8; wherein the predetermined kind(s) of data is equipment operation gesture data transmitted from one equipment to the other equipment.

11. The multi-hop network comprising the communication node according to claim 10; wherein the communication node determines that impersonation has been performed based on whether or not there is a significant difference in characteristics of a gesture in the equipment operation gesture data.

12. The multi-hop network comprising the communication node according to claim 8; wherein the predetermined kind(s) of data is work instruction data transmitted from one equipment to the other equipment.

13. The multi-hop network comprising the communication node according to claim 12; wherein the communication node determines that impersonation has been performed based on whether or not there is a significant difference in a work instruction in the work instruction data.

14. The multi-hop network comprising the communication node according to claim 8; wherein the communication node receives a check result of validity of the equipment from another communication node and checks validity of the equipment by using the check result of validity of the equipment from the another communication node.

15. An equipment validity check method, comprising:
causing a communication node which relays data between equipment communicating with each other via a multi-hop network based on a multi-hop manner to record a predetermined kind(s) of data among the relayed data;
causing the communication node to match the predetermined kind(s) of data against past data recorded and check validity of the equipment; and
causing the communication node to output a check result of the validity of the equipment to a predetermined output destination(s).

16. The equipment validity check method according to claim 15, wherein the predetermined kind(s) of data is equipment operation gesture data transmitted from one equipment to the other equipment.

17. The equipment validity check method according to claim 16, comprising:
causing a communication node to determine that impersonation has been performed based on whether or not there is a significant difference in characteristics of a gesture in the equipment operation gesture data.

18. The equipment validity check method according to claim 15, wherein the predetermined kind(s) of data is work instruction data transmitted from one equipment to the other equipment.

19. The equipment validity check method according to claim 18, comprising:
causing a communication node to determine that impersonation has been performed based on whether or not there is a significant difference in characteristics of a gesture in the equipment operation gesture data.

20. The equipment validity check method according to claim 15, comprising:

causing a communication node to receive a check result of validity of the equipment from another communication node; and causing a communication node to check validity of the equipment by using the check result of validity of the equipment from the another communication node.

* * * * *